(12) United States Patent
Hodge

(10) Patent No.: US 11,770,019 B2
(45) Date of Patent: *Sep. 26, 2023

(54) SYSTEM AND METHOD FOR CHARGING ELECTRONIC DEVICES IN A CONTROLLED ENVIRONMENT

(71) Applicant: **GLOBAL TEL*LINK CORPORATION**, Reston, VA (US)

(72) Inventor: Stephen Lee Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/188,886

(22) Filed: Mar. 1, 2021

(65) Prior Publication Data

US 2021/0257850 A1 Aug. 19, 2021

Related U.S. Application Data

(63) Continuation of application No. 16/556,605, filed on Aug. 30, 2019, now Pat. No. 10,938,234, which is a
(Continued)

(51) Int. Cl.
*H02J 7/00* (2006.01)
*H02J 7/14* (2006.01)
*H02J 7/34* (2006.01)
*H02J 7/35* (2006.01)
*H04L 12/10* (2006.01)
*H04M 19/00* (2006.01)
(Continued)

(52) U.S. Cl.
CPC ............... *H02J 7/345* (2013.01); *H02J 7/35* (2013.01); *H02J 50/00* (2016.02); *H02J 50/10* (2016.02); *H04L 12/10* (2013.01); *H04M 19/001* (2013.01); *H04M 19/08* (2013.01); *H02J 7/0044* (2013.01)

(58) Field of Classification Search
CPC .. H02J 7/345; H02J 7/35; H02J 7/0044; H02J 50/00; H02J 50/10
USPC ......................................................... 320/101
See application file for complete search history.

(56) References Cited

U.S. PATENT DOCUMENTS 6,073,003 A 6/2000 Nilssen
6,346,964 B1 2/2002 Rogers et al.
(Continued)

FOREIGN PATENT DOCUMENTS

EP 3207662 B1 6/2018

OTHER PUBLICATIONS

International Search Report and Written Opinion of the International Searching Authority directed to related International Patent Application No. PCT/US2017/066435, dated Mar. 7, 2018; 10 pages.
(Continued)

*Primary Examiner* — Alexis B Pacheco
(74) *Attorney, Agent, or Firm* — Sterne, Kessler, Goldstein & Fox P.L.L.C.

(57) ABSTRACT

A system, apparatus, and method are disclosed for providing electrical charge to residents of a controlled-environment facility. In an embodiment, a charging station may be provided in an area accessible to an inmate to allow charging of in an inmate smart device, such as a phone or tablet. In an embodiment, a portable charger may be provided to an inmate for charging a smart device.

20 Claims, 5 Drawing Sheets

Related U.S. Application Data continuation of application No. 15/378,526, filed on Dec. 14, 2016, now Pat. No. 10,404,080.

(51) Int. Cl.
*H04M 19/08* (2006.01)
*H02J 50/10* (2016.01)
*H02J 50/00* (2016.01)

(56) References Cited

U.S. PATENT DOCUMENTS

| | | | |
|---|---|---|---|
| 10,404,080 B2 * | 9/2019 | Hodge | ............... H04L 12/10 |
| 10,938,234 B2 | 3/2021 | Hodge | |
| 2006/0113955 A1 | 6/2006 | Nunally | |
| 2008/0057976 A1 | 3/2008 | Rae et al. | |
| 2008/0179968 A1 | 7/2008 | Szabados et al. | |
| 2011/0204843 A1 | 8/2011 | Foster | |
| 2013/0026973 A1 | 1/2013 | Luke et al. | |
| 2013/0252577 A1 | 9/2013 | Jordan | |
| 2014/0009103 A1 | 1/2014 | Nita | |
| 2014/0035539 A1 | 2/2014 | Leyden et al. | |
| 2014/0059263 A1 | 2/2014 | Rosenberg et al. | |
| 2014/0070756 A1 | 3/2014 | Kearns et al. | |
| 2014/0116870 A1 | 5/2014 | Kamen et al. | |
| 2014/0179368 A1 | 6/2014 | Contrata, Jr. et al. | |
| 2014/0232320 A1 | 8/2014 | Ento July et al. | |
| 2014/0239883 A1 | 8/2014 | Hobson et al. | |
| 2015/0048778 A1 | 2/2015 | Davidson | |
| 2015/0364937 A1 | 12/2015 | Becerra et al. | |
| 2016/0099758 A1 | 4/2016 | Bell et al. | |
| 2016/0156207 A1 | 6/2016 | Frankenberger | |
| 2016/0226308 A1 | 8/2016 | Valin et al. | |
| 2016/0300409 A1 | 10/2016 | Peters et al. | |
| 2017/0033579 A1 | 2/2017 | Maguire et al. | |
| 2017/0250828 A1 | 8/2017 | Buchanan | |
| 2018/0090990 A1 | 3/2018 | Enami et al. | |
| 2018/0166893 A1 | 6/2018 | Hodge | |

OTHER PUBLICATIONS

Supplementary European Search Report directed to related European Patent Application No. 17880080.1, dated Aug. 12, 2020; 10 pages.

* cited by examiner

SYSTEM AND METHOD FOR CHARGING ELECTRONIC DEVICES IN A CONTROLLED ENVIRONMENT

CROSS-REFERENCE TO RELATED APPLICATIONS

This application is a Continuation of U.S. patent application Ser. No. 16/556,605, filed Aug. 30, 2019, which is a Continuation of U.S. patent application Ser. No. 15/378,526 filed on Dec. 14, 2016, now U.S. Pat. No. 10,404,080, all of which are hereby incorporated by reference in their entirety.

BACKGROUND

The disclosure relates to a system, apparatus, and method for charging electronic devices in a controlled environment.

In some current correctional facilities, inmates are allowed access to electronic devices or smart devices, such as smart phones and/or tablets. To recharge the smart devices, facility staff must either collect the electronic devices or inmates must relinquish the device at a designated location. As a result, inmates lose the ability to use the smart device while the device is being charged. Further, after charging, the specific smart device must be returned to the proper owner, creating a logistical hardship for the facility.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
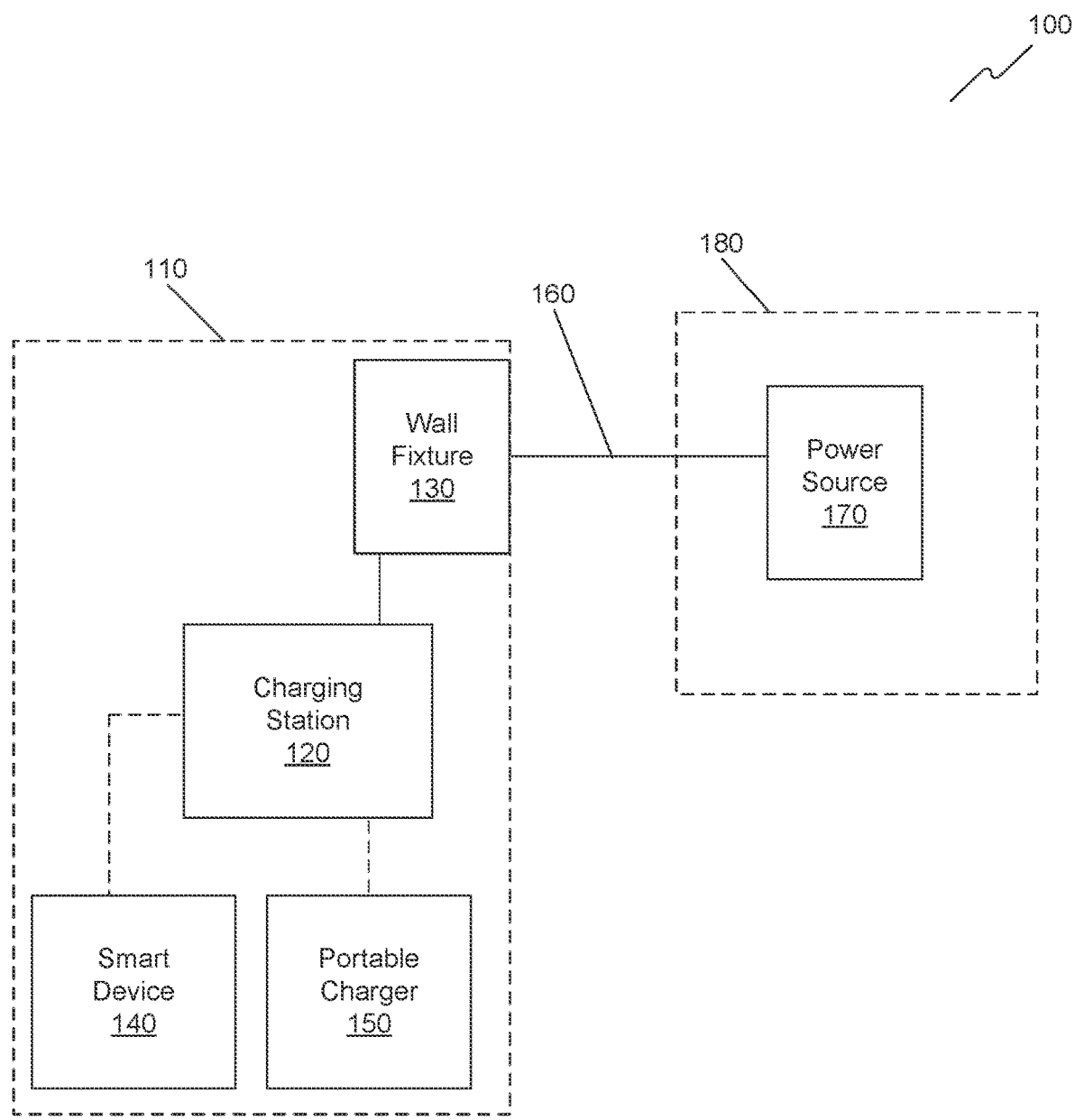
FIG. 1 illustrates a block diagram of a charging system in a controlled environment, according to an embodiment of the invention.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

Embodiments may be implemented in hardware (e.g., circuits), firmware, computer instructions, or any combination thereof. Embodiments may be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, or other hardware devices Further, firmware, routines, computer instructions may be described herein as performing certain actions. However, it should be appreciated that such descriptions are merely for convenience and that such actions in fact results from computing devices, processors, controllers, or other devices executing the firmware, routines, instructions, etc. Further, any of the implementation variations may be carried out by a general purpose computer, as described below.

For purposes of this discussion, the term "module" shall be understood to include at least one of hardware (such as one or more circuit, microchip, processor, or device, or any combination thereof), firmware, computer instructions, and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

With the introduction of smart devices in correctional facilities, inmates have been able to use smart devices such as smart phones and tablets to enhance the rehabilitative process. For example, inmates may use smart devices for music, games, or phone calling. One concern regarding the distribution of smart devices to inmates, however, is the battery life of the device. As an inmate uses the device, the battery charge is spent, requiring facility staff to collect the smart devices for recharging. Alternatively, inmates may be required to deposit the smart device at a specified location for recharging. Either one of these processes forces the inmate to relinquish control of the smart device, preventing the inmate from using the device. Further, the return of the smart device to the inmate creates a logistical problem if the facility staff must return a specific device to the proper inmate.

As such, provided in this disclosure is a system, apparatus, and method for charging electronic devices in a controlled environment. In an embodiment, the system, apparatus, and method prevent temporary loss of smart devices by allowing the device to remain in possession of the inmate while charging. This disclosure first provides a charging system for use in a correctional facility. This charging system allows a facility to utilize existing facility wiring for delivering power to an inmate. In an embodiment, the charging system utilizes existing telephone connections to provide power if traditional wall power outlets do not exist. In another embodiment, a charging station utilizes an energy collector, which includes a photovoltaic cell, to obtain power independent of a wall interface. This system provides a hub for inmates to charge their smart devices so that inmates do not need to surrender their smart devices to staff members for charging. This system is also secured to prevent inmate tampering.

This disclosure also provides a charging station apparatus for use in a correctional facility. The charging station may be a part of a facility-wide charging system or may stand alone. The charging station converts power received from a wall power outlet or a communication outlet, such as a telephone outlet into a configuration that can charge an inmate smart device or a portable charger. The charging station also receives power from components other than wall outlets. For example, the charging station can utilize a solar panel to receive light energy. This feature allows the charging station to provide charge in a correctional facility that may not provide a direct source of power to inmate areas. Using solar panels near a window or light bulb allows energy collection that may not be otherwise available in correctional facility. The charging station also stores energy received from a wall interface or from a solar panel interface. For example, if neither the wall interface nor solar panel can directly charge a smart device or portable charger due to too low of a level of power production, an energy repository can store the energy until a sufficient amount of energy is stored to charge a smart device. This feature allows for a passive accumulation of charge either through the retention of light energy or the trickle charge through a telephone wall outlet. In a correctional facility, this accumulation of energy provides an electrical charge to an inmate that might not otherwise be available if no traditional means of power delivery to an inmate area exist. The charging station is also equipped with safety features to prevent inmate tampering.

This disclosure also provides a portable charger apparatus for use in a correctional facility. The portable charger is configured to receive charge from a charging station or a wall outlet, including power and/or telephone. The portable charger also utilizes a solar panel design to receive light energy, allowing for passive charging in a correctional facility where traditional power delivery outlets are not available. Using a portable charger also allows facility staff to collect portable chargers rather than collecting inmate smart devices for charging. Because portable chargers do not store information personal to an inmate, facility staff can exchange depleted portable chargers with any other portable charger that contains stored energy. This exchange of portable chargers eliminates the requirement for inmates to relinquish their smart devices as well as the logistical problem of returning the proper device to its proper owner.

These and other aspects, features and advantages of the present disclosure will become apparent from the following detailed description of embodiments, which is to be read in connection with the accompanying drawings.

FIG. 1 illustrates an embodiment of a charging system 100 in a controlled environment. Charging system 100 includes a charging station 120, a wall fixture 130, a power cable 160, and a power source 170. Charging station 120 interfaces with smart device 140 and/or portable charger 150 and provides electrical charge to smart device 140 and/or portable charger 150. Charging station 120 also interfaces with wall fixture 130 and receives electrical power from wall fixture 130. Wall fixture 130 connects to power cable 160, which connects to power source 170. Charging station 120 and wall fixture 130 are located in inmate area 110 while power source 170 is located in electrical distribution area 180.

Figure 2:
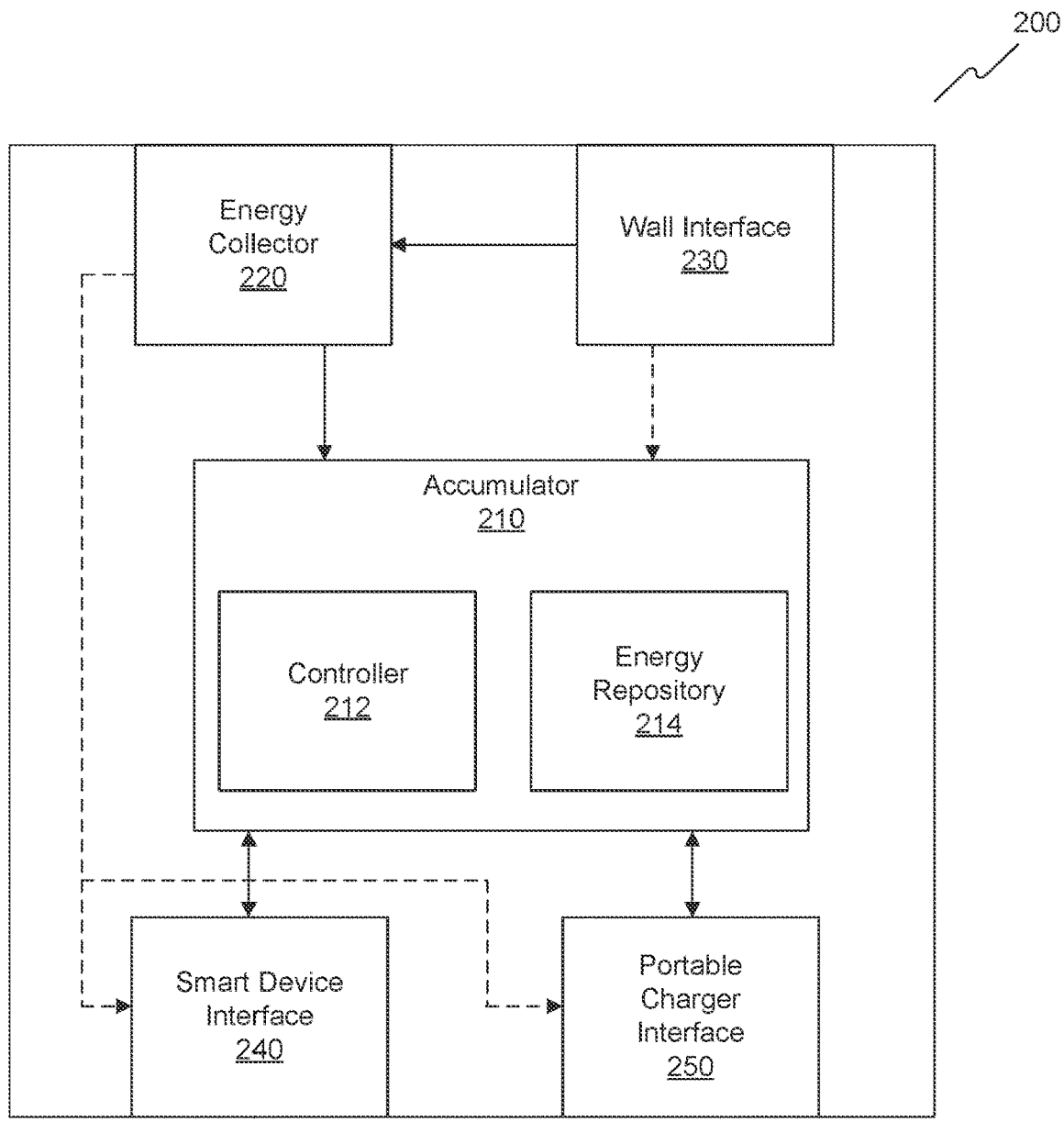
FIG. 2 illustrates a block diagram of a charging station, according to an embodiment of the invention.

In an embodiment, charging system 100 includes a charging station 120. Charging station 120 is a device that utilizes features of a controlled facility to provide charge to inmate smart devices, allowing inmates to retain their smart devices while charging and eliminating the need for staff to remove the smart device from the inmate's possession. Charging station 120 also allows inmates to charge a portable charger 150. The description of FIG. 2 provides an embodiment of charging station 120.

In an embodiment, charging station 120 is located in inmate area 110. Inmate area 110 is a location accessible by inmates of a correctional facility. Inmate area 110 may be a room, cell, hallway, office, recreational facility, library, an enclosed location within a correctional facility, an outdoor location of a correctional facility, a combination thereof and/or the like. Placing charging station 120 in inmate area 110 allows an inmate to charge his or her smart device 140 and/or a portable charger 150 in a controlled facility without needing to relinquish the device to a facility staff member.

Charging station 120 may be portable or may be a stationary fixture. Charging station 120 includes a wall interface to allow an electrical connection with wall fixture 130. Charging station 120 receives electrical power from wall fixture 130. Charging station 120 also includes a smart device interface to allow an electrical connection with smart device 140. Smart device 140 may be, for example, a phone, tablet, laptop, personal computer device, a combination thereof, and/or the like.

Charging station 120 also includes a portable charger interface to allow an electrical connection with portable charger 150. Portable charger 150 is a device capable of storing electrical energy and discharging the electrical energy into smart device 140. An embodiment of portable charger 150 is described in more detail with reference to FIG. 3. Portable charger 150 may also be a rechargeable battery pack.

As described in more detail with reference to FIG. 2, charging station 120 includes an energy collector configured to convert power received from wall fixture 130 into storable energy. In an embodiment, the storable energy from the energy collector may be stored within charging station 120 in an accumulator, which includes an energy repository. Charging station 120 then discharges the stored energy into smart device 140 or a portable charger 150 when one is connected.

In an embodiment, the energy collector also includes a solar panel and/or a photovoltaic cell for gathering energy. These components allow for a passive accumulation of electrical energy. In a correctional facility where wall power outlets may not be available to inmates, the passive accumulation of electrical energy via a solar panel provides a medium for charging inmate smart devices. Charging station 120 also allows for passive accumulation of electrical energy via a wall interface that connects to wall fixture 130.

Wall fixture 130 is a fixture of inmate area 110. In an embodiment, wall fixture 130 is a wall outlet, which provides power via alternating current (AC). For example, wall fixture 130 may be a standard U.S. power outlet providing AC power at 120 Volts and a frequency of 60 Hz. Wall fixture 130 may also provide power at other standard voltages and frequencies.

In an embodiment, wall fixture 130 is a standard telephone outlet. For example, in an inmate cell where a wall power outlet is not available, facility wiring for POTS phones may be available for power delivery. A facility can utilize the telephone outlet to deliver low voltage AC or DC power to wall fixture 130 and inmate area 110. This embodiment allows a facility to provide electrical power to an inmate area that may not traditionally have a wall power outlet. Similarly, wall fixture 130 may be an existing connection used for the installation of a camera, closed circuit television interface, Ethernet interface, television cable interface, a combination thereof, and/or the like. In an embodiment, wall fixture 130 may include a wireless transmitter configured to transmit power wirelessly.

In an embodiment, wall fixture 130 is connected to power source 170 via power cable 160. If wall fixture 130 is a wall outlet, power cable 160 is existing wiring within the facility for delivering power to a wall outlet. If wall fixture 130 is a communication interface such as a telephone outlet, power cable 160 is existing wiring within the facility traditionally used for communication. Power cable 160 may include one or more cables that are of appropriate gauge to deliver power. For example, if power is delivered using telephone wiring, power cable 160 may be 22 gauge or 24 gauge. In an embodiment where power is delivered using a wall outlet, power cable 160 may be a gauge within a range of 6 gauge to 14 gauge.

Power source 170 is a device capable of generating power or transforming power received at the facility into configuration usable in the facility. Power source 170 may include a transformer, a meter, a panel, a panel board, a circuit breaker, a generator, a combination thereof, and/or the like. Power source 170 is located in electrical distribution area 180. Electrical distribution area 180 is an area that generates power or transforms power received from a source external to the correctional facility. Electrical distribution area 180 includes any enclosed space in a facility, such as a basement or utility closet, an outdoor location near the facility, a combination thereof, and/or the like. In an embodiment, power source 170 spreads across multiple locations. For example, a transformer and meter may be located outdoors near the facility while an electrical panel and circuit breaker may be located within the facility. In this embodiment, electrical distribution area 180 spans both the indoor and outdoor locations.

In an embodiment where wall fixture 130 is a telephone outlet or other interface traditionally used for communication, power source 170 provides low voltage AC or DC power to wall fixture 130 via power cable 160. Power cable 160 is existing wiring within the facility traditionally used for communication. For example, power cable 160 may be one or more twisted pairs in shielded or unshielded configurations. In this embodiment, power source 170 may be a generator, transformer, panel, panel board, circuit breaker, a combination thereof, and/or the like. Power source 170 is located in electrical distribution area 180. Electrical distribution area 180 is an area that generates power or transforms power received from a source external to the correctional facility. Electrical distribution area 180 may be an enclosed space in a facility, such as a basement or utility closet, an outdoor location near the facility, a combination thereof, and/or the like. In an embodiment, electrical distribution area 180 includes the demarcation point for a telephone signal. A network interface device (NID) may be located in the electrical distribution area 180.

When a facility is utilizing telephone wiring as power cable 160, power source 170 first uses a transformer to transform standard wall power into low voltage AC or DC power. In an embodiment, power source 170 also generates low voltage power independently of the wall power using a generator. The low voltage power delivered from power source 170 is transmitted via power cable 160 to wall fixture 130. As a result, charging station 120, which is connected to wall fixture 130, receives the transmitted power. In an embodiment where wall fixture 130 is a telephone outlet or other communication medium, charging station 120 continuously receives a trickle charge from wall interface 130. Charging station 120 then accumulates this charge in order to deliver the charge to smart device 140 or portable charger 150. This trickle charge configuration allows for the accumulation of energy that can be converted at charging station 120 to charge an inmate device. Without this accumulation, inmate area 110 may receive an insufficient amount of power to charge an inmate device.

In an embodiment, power source 170 is consistently operational. Charging station 120 may receive a consistent trickle charge from power source 170 via power cable 160 and wall fixture 130. In an embodiment, power source 170 is regulated. For example, a facility may automatically regulate the time of day when power source 170 provides power to power cable 160. Facility staff may manually or automatically set times where power source 170 is operational. In an embodiment, portable charger 150 provides power to charger station 120. Facility staff use portable charger 150 to deliver storable energy to charging station 120. Inmates may then utilize charging station 120 to receive charge at smart device 140. This configuration gives more control to facility staff to regulate the times when charging may occur.

FIG. 2 illustrates an embodiment of a charging station 200. Charging station 200 is a device that collects energy from existing correctional facility features, stores the energy, and discharges the energy to charge an inmate smart device or portable charger. By placing charging station 200 in an area accessible to inmates, inmates will be able to charge their smart devices without the need for relinquishing control over the smart device.

In an embodiment, charging station 200 includes an accumulator 210, an energy collector 220, a wall interface 230, a smart device interface 240, and a portable charger interface 250. Accumulator 210 includes a controller 212 and/or an energy repository 214.

In an embodiment, charging station 200 is used in the charging system described with reference to FIG. 1. For example, charging station 200 includes a wall interface 230 that connects to a wall fixture in an inmate area. Wall interface 230 may be a plug that directly plugs into a wall fixture socket, such as, for example, a wall outlet, telephone outlet, another communication outlet, a combination thereof, and/or the like. In an embodiment, a cable or wire connects wall interface 230 to a wall fixture. In an embodiment, wall interface 230 includes wireless power collection circuitry to receive wirelessly transmitted power. Wall interface 230 may also directly connect to accumulator 210 without a connection to energy collector 220.

In an embodiment, wall interface 230 is coupled to energy collector 220. This coupling allows wall interface 230 to deliver power to energy collector 220. Energy collector 220 may include power electronics, such as, for example, rectifiers, diodes, thyristors, semiconductors, capacitors, transistors, a combination thereof, and/or the like. Energy collector 220 converts received power into a state storable in accumulator 210. For example, if wall interface 230 receives AC power at 120 Volts and a frequency of 60 Hz, energy collector 220 may convert the power into a 5 Volt direct current (DC) form. Energy collector 220 directs this DC power to accumulator 210, smart device interface 240, or portable charger interface 250. Although FIG. 2 depicts wall interface 230 and energy collector 220 as separate modules, in an embodiment, wall interface 230 and energy collector 220 may comprise the same hardware.

In an embodiment, wall interface 230 receives low voltage AC or DC power through a telephone outlet or communications outlet. Wall interface 230 is configured to receive a twisted pair wiring configuration. Energy collector 220 utilizes power electronics to convert this power into a state storable in accumulator 210, smart device interface 240, or portable charger interface 250.

In an embodiment, energy collector 220 also receives a trickle charge from wall interface 230. Energy collector 220 then processes this trickle charge in a form storable in accumulator 210. This embodiment allows the delivery of power even when a conventional wall power outlet is unavailable in an inmate area.

In an embodiment, energy collector 220 collects energy independent of wall interface 230. For example, wall interface 230 may not be operational. Wall interface 230 may not receive power from a wall fixture or may be damaged. In another embodiment, wall interface 230 may not be a component that exists in charging system 200. In at least these cases, energy collector 220 operates independently of wall interface 230.

In an embodiment, energy collector 220 includes one or more components capable of receiving energy. For example, energy collector 220 comprises one or more solar panels, photovoltaic cells, thermal energy collectors, wireless power receivers, devices for harnessing piezoelectricity, mechanical power interfaces, such as, for example, a crank, a combination thereof, and/or the like. One or more of these components may be mounted or built into charging station 200. Energy collector 220 collects energy and converts the received energy into a state storable in accumulator 210, smart device 240, or portable charger interface 250. For example, if a solar panel and/or photovoltaic cell produces 12 Volts DC, energy collector 220 steps-down the power to a 5 Volt DC form for energy storage. In the correctional facility context, energy collector 320 allows charging station 200 to collect and store energy from existing features of a facility, such as light energy. This collection allows for a smart device charging source that may not otherwise be available in a correctional facility due to a lack of conventional wall power outlets.

In an embodiment, energy collector 220 may comprise a solar panel and/or photovoltaic cell located on the surface of charging station 200 and/or located in an inmate area. The solar panel may be affixed on a wall, oriented to receive light from a light source, such as a light bulb, and/or from natural sunlight. If the solar panel is not mounted on charging station 200, a cable may connect the solar panel to energy collector 220. This configuration allows for charging station 200 to passively accumulate charge in a correctional facility if a conventional wall power outlet is unavailable. As such, an inmate is able to charge his or her smart device even in a scenario where no power outlet exists.

In an embodiment, accumulator 210 receives power from energy collector 220 and/or wall interface 230. Accumulator 210 includes circuitry for storing energy and discharging stored energy. Accumulator 210 stores energy in energy repository 214 by matching the polarity of the external voltage source to the polarity of energy repository 214. Direct current may be sent into energy repository 214 in the direction opposite from the discharging direction. Energy may also be stored utilizing bulk charging, absorption, and/or floating techniques. Accumulator 210 discharges stored energy when a smart device is connected to smart device interface 240. Accumulator 210 also discharges stored energy when a portable charger is connected to portable charger interface 250.

Accumulator 210 includes a controller 212 and an energy repository 214. Controller 212 includes one or more processors, logic devices, energy sensors, LEDs, visual display screens, a combination thereof, and/or the like. Controller 212 detects when power is received at charging station 200. Specifically, controller 212 detects power reception at energy collector 220, wall interface 230, portable charger interface 250, a combination thereof, and/or the like. Controller 212 also detects power transmission to accumulator 210. Additionally, controller 212 detects the amount and type of power being transmitted to and/or from charging station 200, energy collector 220, wall interface 230, accumulator 210, smart device interface 240, portable charger interface 250, a combination thereof, and/or the like. Controller 212 also detects whether a smart device is connected to smart device interface 240 and/or whether a portable charger is connected to portable charger interface 250.

In an embodiment, controller 212 detects the amount of energy stored in energy repository 214. Energy repository 214 is a device capable of storing electrical charge. For example, energy repository 214 includes one or more batteries, capacitors, supercapacitors, a combination thereof, and/or the like. Controller 212 monitors the voltage across energy repository 214 and/or the voltage across a load. Controller 212 then processes the measured voltage to determine and/or estimate the stored charge in energy repository 214. This determination and/or estimation occurs using a look-up table, which maps voltage to charge remaining.

In an embodiment, controller 212 determines if the amount of energy stored in energy repository 214 exceeds a threshold. If the amount of stored energy exceeds the threshold, controller 212 ceases charging of energy repository 214 to prevent the energy repository from becoming over-charged. Controller 212 prevents power from flowing into energy repository 214 by utilizing an open circuit state.

In an embodiment, if controller 212 detects that a smart device is connected to smart device interface 240 and/or a portable charger is connected to portable charger interface 250, controller 212 directs energy repository 214 to discharge stored energy into the connected device. Controller 212 may regulate the amount of energy that is discharged. For example, controller 212 prevents energy repository 214 from discharging more energy if the remaining charge of energy repository 214 falls below a threshold.

In an embodiment, controller 212 visually displays the amount of energy stored in energy repository 214. Controller 212 may utilize LEDs to demonstrate the amount of stored energy. Controller 212 may also utilize a visual display screen to display the amount of stored energy. These visual indicators offer various degrees of granularity in reflecting the amount of stored energy in energy repository 214. The visual displays may be mounted and/or located on the exterior of charging station 200.

In an embodiment, smart device interface 240 is an interface that allows charging station 200 to connect to an inmate smart device. An inmate smart device may be, for example, a phone, tablet, laptop, personal computer device, a combination thereof, and/or the like. Smart device interface 240 is configured to allow charging of the inmate smart device. For example, smart device interface 240 may include one or more USB sockets, coaxial cable sockets, AC adapter sockets, a combination thereof, and/or the like. An inmate may plug a cable into smart device interface 240 in order to charge an inmate smart device.

In an embodiment, charging station 200 may be located in a communal location, allowing many cables to plug into smart device interface 240. When an inmate smart device is plugged into smart device interface 240, either directly or via a connection cable, accumulator 210 discharges energy stored in energy repository 214 into the inmate smart device. Energy collector 220 may also directly provide charge to the inmate smart device connected to smart device interface 240.

In an embodiment, smart device interface 240 may be a wireless interface, allowing charging station 200 to wirelessly couple to an inmate smart device. Charging station 200 may wirelessly deliver power from smart device interface 240 to an inmate smart device.

In an embodiment, smart device interface 240 is communicatively coupled to controller 212. A smart device connects to charging station 200 using smart device interface 240. The smart device communicates with controller 212 to obtain information relating to charging station 200. For example, the smart device may obtain an indication of the quantity of energy stored in energy repository 214 and/or information regarding power received by charging station 200 at wall interface 230 and/or energy collector 220. Additionally, smart device may obtain information regarding the rate at which energy is being stored in energy repository 214.

In an embodiment, controller 212 obtains information about a connected smart device using smart device interface 240. A smart device sends status information to controller 212 using smart device interface 240. Controller 212 may obtain information regarding the remaining charge of a smart device. Controller 212 utilizes this information in regulating the amount of energy discharged to smart device interface 240.

In an embodiment, portable charger interface 250 is an interface that allows charging station 200 to connect to a portable charger. An embodiment of a portable charger is further described in reference to FIG. 3. A portable charger may be a commercial portable charger, portable battery, power bank, a combination thereof, and/or the like. The portable charger is configured to connect to an inmate smart device and provide charge to the inmate smart device. The portable charger also connects to charging station 200 via portable charger interface 250. Portable charger interface 250 may include one or more USB sockets, coaxial cable sockets, AC adapter sockets, a combination thereof, and/or the like. An inmate may plug a cable into portable charger interface 250 in order to charge a portable charger.

In an embodiment, charging station 200 is located in a communal location, allowing many cables to plug into portable charger interface 250. When a portable charger is plugged into portable charger interface 250, either directly or via a connection cable, accumulator 210 discharges energy stored in energy repository 214 into the portable charger. Energy collector 220 may also directly provide charge to the portable charger connected to portable charger interface 250.

In an embodiment, portable charger interface 250 may be a wireless interface, allowing charging station 200 to wirelessly couple to a portable charger. Charging station 200 may wirelessly deliver power from portable charger interface 250 to a portable charger.

In an embodiment, smart device interface 240 and portable charger interface 250 may comprise the same hardware. Smart device interface 240 and portable charger interface 250 may include a USB socket. Smart device interface 240 and portable charger interface 250 may also include a wireless transmitter, receiver, a combination thereof, and/or the like.

In an embodiment, charging station 200 does not provide a smart device interface 240 and only provides portable charger interface 250. In this embodiment, inmates must use a portable charger to charge inmate smart devices. In that case, portable chargers are charged using portable charger interface 250.

In an embodiment, facilities utilize charging station 200 to charge portable chargers rather than allowing inmates to access charging station 200. Facility staff may collect portable chargers from inmates for charging. Facility staff then swap a depleted portable charger with one containing a stored charge. In this embodiment, inmates will still be able to use their smart devices, optionally attaching a portable charger to provide extra charge as the charge of the smart device is depleted. Further, facility staff will be able to avoid the logistical problem of returning a smart device to its proper owner. Because portable chargers are interchangeable among inmates, facility staff may provide any portable charger to an inmate without concern for appropriate inmate ownership.

In an embodiment, a portable charger provides charge to accumulator 210 via portable charger interface 250. Charging station 200 is configured to receive power via portable charger interface 250. For example, facility staff may utilize a switch or other means of interacting with controller 212 to allow charging of charging station 200 via portable charger interface 250. In cases where charging station 200 does not receive power from energy collector 220 or wall interface 230, facility staff provides temporary charge via portable charger interface 250.

In an embodiment, charging station 200 includes safety measures to prevent inmate tampering with charging station 200. For example, charging station 200 may include visual alarms, flashing lights, audio alarms, an alert to facility staff, a combination thereof, and/or the like. These warnings allow facilities to minimize tampering and to place charging station 200 in areas accessible to inmates.

Figure 3:
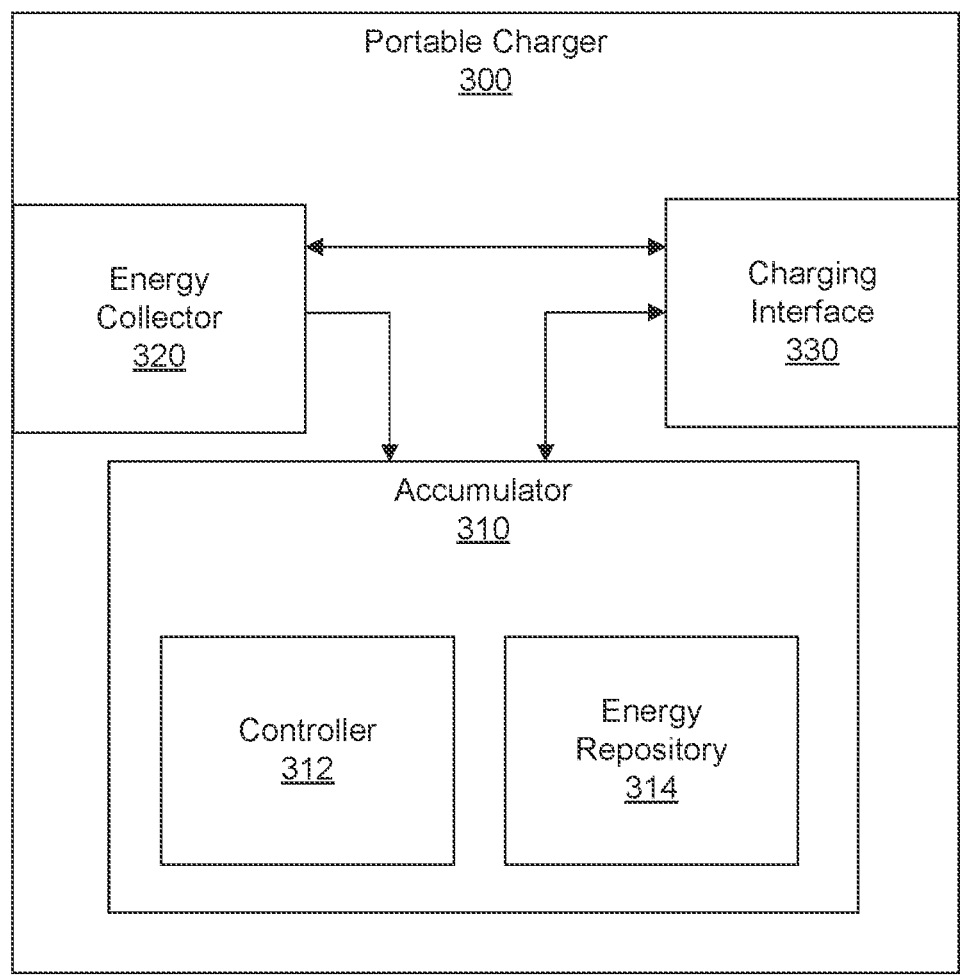
FIG. 3 illustrates a block diagram of a portable charger, according to an embodiment of the invention.

FIG. 3 illustrates an embodiment of a portable charger 300. Portable charger 300 is a device capable of charging an inmate smart device. Providing inmates with portable charger 300 to charge smart devices allows correctional facilities to avoid the logistical problem of collecting inmate smart devices for charging. Further, because inmates do not store personal information on portable charger 300, portable charger 300 is interchangeable among inmates, allowing staff members to freely redistribute portable charger 300 to different inmates. Using portable charger 300 in a correctional facility allows inmates to retain control of smart devices while the smart devices are charging and also avoids the logistical hardship of collecting and returning inmate smart devices.

In an embodiment, portable charger 300 includes an accumulator 310, an energy collector 320, and a charging interface 330. Accumulator 310 includes a controller 312 and/or an energy repository 314. Inmates in a controlled facility can use portable charger 300 to charge an inmate smart device.

In an embodiment, energy collector 320 includes power electronics, such as, for example, rectifiers, diodes, thyristors, semiconductors, capacitors, transistors, a combination thereof, and/or the like. Energy collector 320 converts received power into a state storable in accumulator 310. For example, energy collector 320 converts power received at charging interface 330 into a state storable in accumulator 310. For example, if charging interface 330 receives AC power at 120 Volts and a frequency of 60 Hz, energy collector 320 converts the power into a 5 Volt direct current (DC) form. Energy collector 320 then directs this DC power to accumulator 310.

In an embodiment, energy collector 320 includes one or more components capable of receiving energy independent of charging interface 330. For example, energy collector 320 may include a solar panel, photovoltaic cell, a thermal energy collector, a wireless power receiver, a device for harnessing piezoelectricity, a mechanical power interface, such as, for example, a crank, a combination thereof, and/or the like. One or more of these components may be mounted or built into portable charger 300. Energy collector 320 collects energy and converts the received energy into a state storable in accumulator 310. For example, if a solar panel and/or photovoltaic cell produces 12 Volts DC, energy collector 320 may step-down the power to a 5 Volt DC form for energy storage. In the correctional facility context, energy collector 320 allows portable charger 300 to collect and store energy from existing features of a facility, such as light energy. This collection allows for a smart device charging source that may not otherwise be available in a correctional facility due to a lack of conventional wall power outlets.

In an embodiment, accumulator 310 receives power from energy collector 320 and/or charging interface 330. Accumulator 310 includes circuitry for storing energy and discharging stored energy. Energy is stored in energy repository 314 by matching the polarity of the external voltage source to the polarity of the energy repository. Direct current is sent into energy repository 314 in the direction opposite from the discharging direction. Energy may be stored utilizing bulk charging, absorption, and/or floating techniques. Accumulator 310 discharges stored energy when a smart device is connected to charging interface 330. Accumulator 310 stores energy when charging interface 330 is connected to a power source.

Accumulator 310 includes a controller 312 and an energy repository 314. Controller 312 includes one or more processors, logic devices, energy sensors, LEDs, visual display screens, a combination thereof, and/or the like. Controller 312 detects when power is received at portable charger 300. Controller 312 detects power reception at energy collector 320 and/or charging interface 330 as well as whether power is being transmitted to accumulator 310. Controller 312 also detects the amount and type of power being transmitted to and/or from portable charger 300, energy collector 320, charging interface 330, accumulator 310, and/or a combination thereof.

In an embodiment, controller 312 detects whether a smart device is connected to charging interface 330 and/or whether charging interface 330 is connected to a source of power, such as, for example, a charging station and/or a wall outlet. If a smart device is connected to charging interface 330, controller 312 directs energy repository 314 to discharge stored energy into the smart device via charging interface 330. If a power source is connected to charging interface 330, controller 312 directs energy repository 314 to store energy received from the power source.

In an embodiment, controller 312 detects the amount of energy stored in energy repository 314. Energy repository 314 is a device capable of storing electrical charge. In an embodiment, energy repository 314 may be one or more batteries, capacitors, supercapacitors, a combination thereof, and/or the like. Controller 312 monitors the voltage across energy repository 314 and/or the voltage across a load. Controller 312 then processes the measured voltage to determine and/or estimate the stored charge in energy repository 314. This determination and/or estimation occurs using a look-up table, which maps voltage to charge remaining.

In an embodiment, controller 312 also determines if the amount of energy stored in energy repository 314 exceeds a threshold. If the amount of stored energy exceeds the threshold, controller 312 ceases charging of energy repository 413 to prevent energy repository 314 from becoming over-charged. Controller 312 prevents power from flowing into energy repository 314 by utilizing an open circuit state.

In an embodiment, if controller 312 detects that an smart device is connected to charging interface 330, controller 312 directs energy repository 314 to discharge stored energy into the connected smart device. Controller 312 may regulate the amount of energy that is discharged. For example, controller 312 may prevent energy repository 314 from discharging more energy if the remaining charge of energy repository 314 falls below a threshold.

In an embodiment, controller 312 visually displays the amount of energy stored in energy repository 314. Controller 312 may utilize LEDs to demonstrate the amount of stored energy. Controller 312 may also utilize a visual display screen to display the amount of stored energy. These visual indicators offer various degrees of granularity in reflecting the amount of stored energy in energy repository 314. The visual displays may be mounted on the exterior of portable charger 300.

In an embodiment, charging interface 330 is an interface that allows portable charger 300 to connect to an inmate smart device and/or a source of power, such as, for example, a charging station and/or a wall outlet. An inmate smart device may be, for example, a phone, tablet, laptop, personal computer device, a combination thereof, and/or the like. Charging interface 330 is configured to allow charging of the inmate smart device. For example, charging interface 330 includes one or more USB sockets, coaxial cable sockets, AC adapter sockets, a combination thereof, and/or the like. In an embodiment, an inmate may plug a cable into charging interface 330 in order to charge an inmate smart device. Portable charger 300 may include a plurality of connection sockets, allowing many cables to plug into charging interface 330. When an inmate smart device is plugged into charging interface 330, either directly or via a connection cable, accumulator 310 may discharge energy stored in energy repository 314 into the inmate smart device. In an embodiment, energy collector 320 may directly provide charge to the inmate smart device connected to charging interface 330 without first passing into accumulator 310.

In an embodiment, charging interface 330 includes a wireless interface, allowing portable charger 300 to wirelessly couple to an inmate smart device. Portable charger 300 delivers power wirelessly from charging interface 330 to an inmate smart device. Charging interface 330 is also configured to receive wirelessly transmitted power. Charging interface 330 receives wirelessly transmitted power from a charging station.

In an embodiment, charging interface 330 includes a plug interface that plugs directly into an inmate smart device to provide a charge. Charging interface 330 may also include a plug interface that plugs directly into a power source such as a charging station, wall outlet, communication outlet, a combination thereof, and/or the like in order to charge portable charge 300. In an embodiment where charging interface 330 is connected to a power source, controller 312 configures energy repository 314 to store charge received from the power source.

In an embodiment, charging interface 330 is communicatively coupled to controller 312. A smart device may connect to portable charger 300 using charging interface 330. The smart device then communicates with controller 312 to obtain information relating to portable charger 300. For example, the smart device may obtain an indication of the quantity of energy stored in energy repository 314. The smart device may also obtain information regarding power received by portable charger 300 at energy collector 320. For example, the smart device may obtain the amount of power being received and/or the rate at which energy is being stored in energy repository 314.

In an embodiment, controller 312 obtains information about a connected smart device using charging interface 330. A smart device sends status information to controller 312 using charging interface 330. Controller 312 may obtain information regarding the remaining charge of a smart device. Controller 312 then utilizes this information in regulating the amount of energy that may be discharged to charging interface 330.

In an embodiment, charging interface 330 provides charge to a charging station. As explained in reference to FIG. 2, facility staff may use a portable charger to deliver power to a charging station that fails to receive power from a wall interface or energy collector.

In an embodiment, energy collector 320 and charging interface 330 comprise the same hardware. In an embodiment, charging interface may simultaneously provide charge to an inmate smart device while receiving charge from a power source.

In an embodiment, portable charger 300 includes safety measures to prevent inmate tampering with portable charger 300. For example, portable charger 300 include visual alarms, flashing lights, audio alarms, an alert to facility staff, a combination thereof, and/or the like. These warnings allow facilities to minimize tampering and to give portable charger 300 to inmates.

Figure 4:
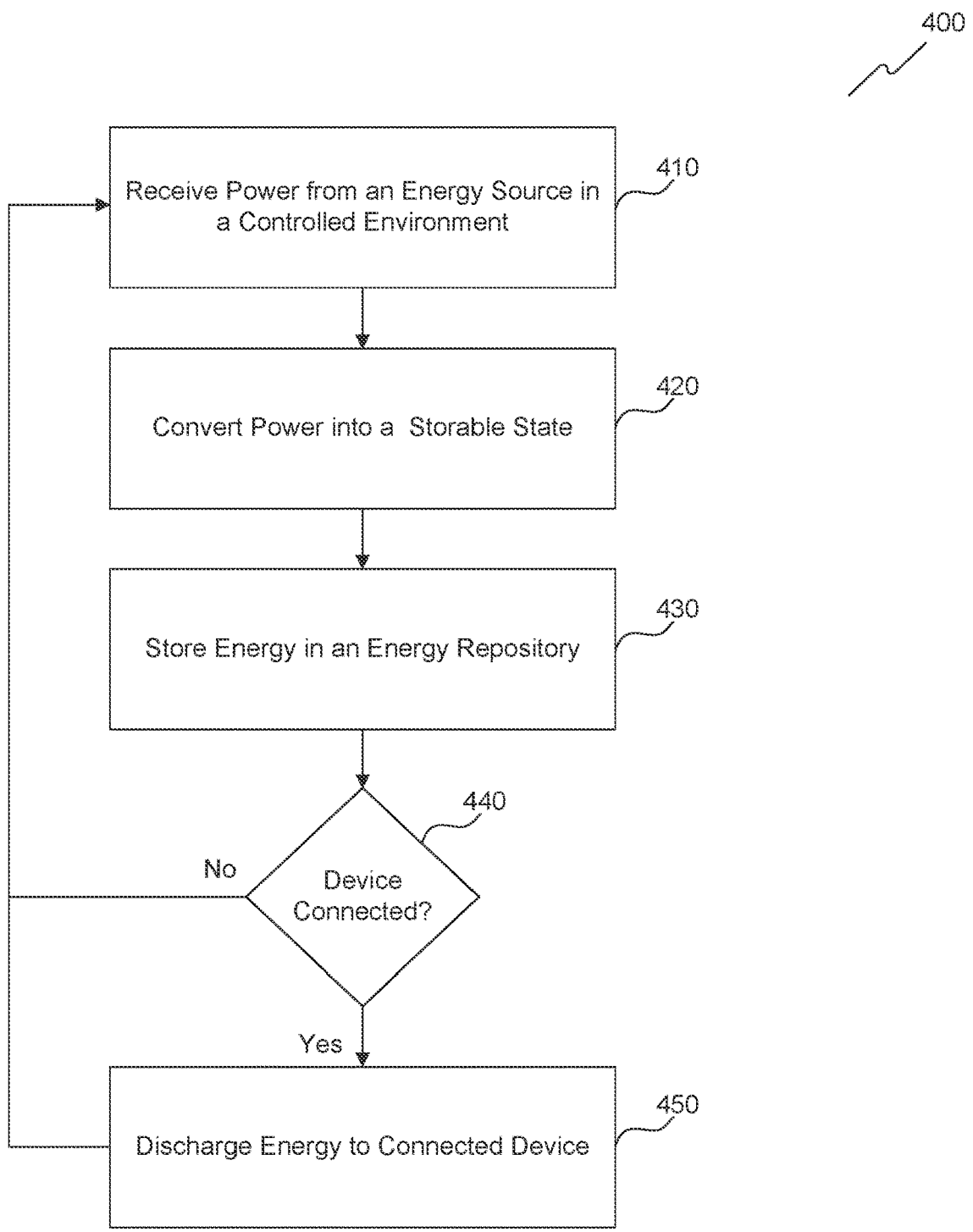
FIG. 4 illustrates a flowchart diagram of a method of providing electrical charge in a controlled environment, according to an embodiment of the invention.

FIG. 4 illustrates a flowchart diagram of an embodiment of method 400 for providing electrical charge in a controlled environment. In an embodiment, method 400 may be performed at a charging station provided in an inmate area.

At 410, power may be received from an energy source in a controlled environment. In an embodiment, power may be received at a charging station located within a controlled environment. Similar to the description associated with FIGS. 1 and 2, a charging station receives power from a wall fixture located in an inmate area. A charging station can also receive power from an energy collector, such as, for example, a solar panel and/or a photovoltaic cell. A solar panel connected to a charging station may be positioned near a natural sunlight source such as a window and/or may be positioned near a light bulb source. This configuration allows for the passive accumulation of charge in a correctional facility if a conventional wall power outlet is unavailable. As such, an inmate is able to charge his or her smart device even in a scenario where no power outlet exists.

At 420, received power may be converted into a storable state. In an embodiment, if power is received at a charging station, the configuration of the power may need to be changed before the power may be stored. For example, if a charging station receives AC power from a wall outlet at 120 Volts and a frequency of 60 Hz, the power may be converted into a 5 Volt direct current (DC) form for energy storage. In an embodiment, if a solar panel and/or photovoltaic cell produces 12 Volts DC, for example, the power may be stepped-down to a 5 Volt DC form for energy storage.

At 430, energy may be stored in an energy repository. Similar to the description associated with FIG. 2, an energy repository is a device capable of storing electrical charge. An energy repository includes one or more batteries, capacitors, supercapacitors, a combination thereof, and/or the like. Energy may be stored in an energy repository by matching the polarity of the external voltage source to the polarity of the energy repository. Direct current is sent into the energy repository in the direction opposite from the discharging direction. Energy may be stored utilizing bulk charging, absorption, and/or floating techniques. A controller may also determine if the amount of energy stored in an energy repository exceeds a threshold. If the amount of stored energy exceeds the threshold, the controller may cease charging of the energy repository to prevent the energy repository from becoming over-charged.

At 440, a check may be performed to determine whether a device is connected. In reference to the charging station of FIG. 2, a device may be an inmate smart device and/or a portable charger. The inmate smart device and/or the portable charger may be connected to a charging station. If a device is connected, method 400 executes 450. If a device is not connected, method 400 executes 410 and receives power from an energy source in a controlled environment.

At 450, energy may be discharged to a connected device. In an embodiment described in FIG. 1, energy is discharged to an inmate smart device and/or a portable charger. A charging station discharges the energy via a smart device interface and/or a portable charger interface. The amount of energy that is discharged may be regulated. For example, a controller within a charging station may prevent an energy repository from discharging more energy if the remaining charge of the energy repository falls below a threshold. The controller may regulate the discharging based on the total charge of the connected device. For example, if the stored energy in a connected device exceeds a threshold, a controller may cease to discharge energy to the connected device. Method 400 then executes 410 after discharging energy to a connected device. In an embodiment, power may simultaneously be received at 410, converted at 420, and stored at 430 while energy is being discharged at 450.

In an embodiment, method 400 may be performed at a portable charger available for an inmate to use in charging a smart device At 410, power may be received from an energy source in a controlled environment. In an embodiment, power may be received at a portable charger located within a controlled environment. Similar to the description associated with FIGS. 1 and 2, a portable charger receives power from a charging station located in an inmate area. The portable charger receives power from a charging station via a portable charger interface located in and/or on a charging station. Referring to an embodiment of FIG. 3, a portable charger may receive power from an energy collector, such as, for example, a solar panel and/or photovoltaic cell. The portable charger may also receive power directly from a wall fixture in a controlled environment.

At 420, received power may be converted into a storable state. In an embodiment, if power is received at a portable charger, the configuration of the power may need to be changed before the power may be stored. For example, if a portable charger receives AC power from a wall outlet at 120 Volts and a frequency of 60 Hz, the power may be converted into a 5 Volt direct current (DC) form for energy storage. In an embodiment, if a solar panel and/or photovoltaic cell produces 12 Volts DC, for example, the power may be stepped-down to a 5 Volt DC form for energy storage. In an embodiment, a portable charger may receive power that is already in a storable state. For example, a charging station may perform the conversion such that energy may be stored. If the power received is already in a storable state, method 400 performs 410 and then perform 430.

At 430, energy may be stored in an energy repository. Similar to the description associated with FIG. 3, an energy repository is a device capable of storing electrical charge. An energy repository includes one or more batteries, capacitors, supercapacitors, a combination thereof, and/or the like. Energy may be stored in an energy repository by matching the polarity of the external voltage source to the polarity of the energy repository. Direct current is sent into the energy repository in the direction opposite from the discharging direction. Energy may be stored utilizing bulk charging, absorption, and/or floating techniques. A controller may also determine if the amount of energy stored in an energy repository exceeds a threshold. If the amount of stored energy exceeds the threshold, the controller may cease charging of the energy repository to prevent the energy repository from becoming over-charged.

At 440, a check may be performed to determine whether a device is connected. In reference to the portable charger of FIG. 3, a device may be an inmate smart device and/or a charging station. The inmate smart device and/or the charging station may be connected to a portable charger via a charging interface. If a device is connected, method 400 executes 450. If a device is not connected, method 400 executes 410 and receives power from an energy source in a controlled environment.

At 450, energy may be discharged to a connected device. In an embodiment described in FIG. 3, energy is discharged to an inmate smart device and/or a charging station. A portable charger discharges the energy via a charging interface. The amount of energy that is discharged may be regulated. For example, a controller within a portable charger may prevent an energy repository from discharging more energy if the remaining charge of the energy repository falls below a threshold. The controller may regulate the discharging based on the total charge of the connected device. For example, if the stored energy in a connected device exceeds a threshold, a controller may cease to discharge energy to the connected device. Method 400 then executes 410 after discharging energy to a connected device. In an embodiment, power may simultaneously be received at 410, converted at 420, and stored at 430 while energy is being discharged at 450.

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 5:
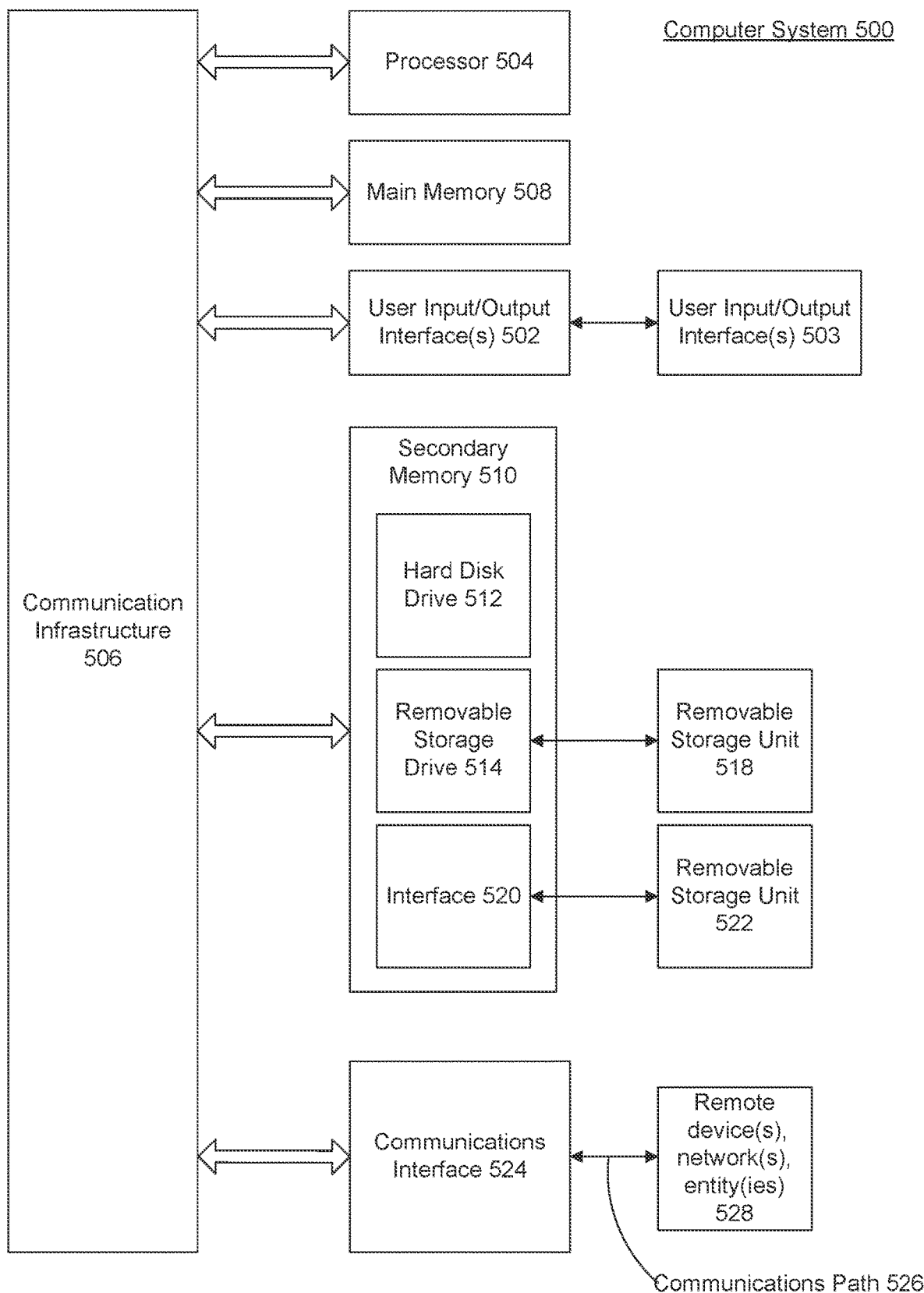
FIG. 5 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the method of flowchart 400 may be implemented in the environment of one or more computer systems or other processing systems. An example of such a computer system 500 is shown in FIG. 5. One or more of the modules depicted in the previous figures can be at least partially implemented on one or more distinct computer systems 500.

Computer system 500 may be any well-known computer capable of performing the functions described herein.

Computer system 500 may include one or more processors (also called central processing units, or CPUs), such as a processor 504. Processor 504 may be connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include user input/output device(s) 503, such as monitors, keyboards, pointing devices, etc., that communicate with communication infrastructure 506 through user input/output interface(s) 502.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, a removable flash drive, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, removable flash drive, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 5. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A method of a portable charger, the method comprising:
   receiving an electrical charge;
   accumulating the electrical charge in an accumulator;
   receiving remaining charge information from a device; and
   discharging the electrical charge to the device based on the remaining charge information.

2. The method of claim 1, further comprising:
   converting the electrical charge into a state storable in the accumulator.

3. The method of claim 1, further comprising:
   determining that an amount of the electrical charge in the accumulator is below a threshold; and
   regulating, in response to the determining, discharging of the electrical charge.

4. The method of claim 1, further comprising:
   determining that an amount of the electrical charge in the accumulator is above a threshold; and
   ceasing, in response to the determining, accumulating of the electrical charge.

5. The method of claim 1, further comprising:
   wirelessly receiving the electrical charge; and
   wirelessly discharging the electrical charge to the device.

6. The method of claim 1, further comprising:
   wirelessly transmitting charging information to the device,
   wherein the portable charger is wirelessly coupled to the device.

7. The method of claim 6, wherein the charging information includes an amount of the electrical charge or a rate of accumulating the electrical charge in the accumulator.

8. The method of claim 1, further comprising:
   receiving and discharging the electrical charge simultaneously.

9. A portable charger, comprising:
   an accumulator;
   a charging interface configured to receive an electrical charge;
   an energy collector configured to accumulate the electrical charge in the accumulator; and
   a controller, coupled to the charging interface, configured to:
     receive remaining charge information from a device; and
     discharge the electrical charge to the device based on the remaining charge information.

10. The portable charger of claim 9, wherein the energy collector is further configured to converting the electrical charge into a state storable in the accumulator.

11. The portable charger of claim 9, wherein the controller is further configured to:
    determine that an amount of the electrical charge in the accumulator is below a threshold; and
    regulate, in response to the determining, discharging of the electrical charge.

12. The portable charger of claim 9, wherein the controller is further configured to:

determine that an amount of the electrical charge in the accumulator is above a threshold; and cease, in response to the determining, accumulating of the electrical charge.

13. The portable charger of claim 9, wherein the charging interface is further configured to:

wirelessly receive the electrical charge; and wirelessly discharge the electrical charge to the device.

14. The portable charger of claim 9, wherein the charging interface is further configured to:

wirelessly transmit charging information to the device, wherein the portable charger is wirelessly coupled to the device.

15. The portable charger of claim 14, wherein the charging information includes an amount of the electrical charge or a rate of accumulating the electrical charge in the accumulator.

16. The portable charger of claim 9, wherein the charging interface is further configured to:

receive and discharge the electrical charge simultaneously.

17. A non-transitory computer-readable medium (CRM) comprising instructions to, upon execution of the instructions by one or more processors of a portable charger, cause the portable charger to perform operations, the operations comprising:

receiving an electrical charge;

accumulating the electrical charge in an accumulator;

receiving remaining charge information from a device; and discharging the electrical charge to the device based on the remaining charge information.

18. The non-transitory CRM of claim 17, wherein the operations further comprise:

determining that an amount of the electrical charge in the accumulator is above a threshold; and ceasing, in response to the determining, accumulating of the electrical charge.

19. The non-transitory CRM of claim 17, wherein the operations further comprise:

wirelessly transmitting charging information to the device, wherein the portable charger is wirelessly coupled to the device.

20. The non-transitory CRM of claim 19, wherein the charging information includes an amount of the electrical charge or a rate of accumulating the electrical charge in the accumulator.

* * * * *